US006266743B1

(12) United States Patent
Carpenter et al.

(10) Patent No.: US 6,266,743 B1
(45) Date of Patent: Jul. 24, 2001

(54) METHOD AND SYSTEM FOR PROVIDING AN EVICTION PROTOCOL WITHIN A NON-UNIFORM MEMORY ACCESS SYSTEM

(75) Inventors: Gary Dale Carpenter, Pflugerville; Mark Edward Dean; David Brian Glasco, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,365

(22) Filed: Feb. 26, 1999

(51) Int. Cl.[7] .................................................. G06F 12/00
(52) U.S. Cl. ........................ 711/143; 711/122; 711/141; 711/145; 711/155; 712/28
(58) Field of Search .................................. 711/143, 141, 711/122, 145, 155; 712/28

(56) References Cited

U.S. PATENT DOCUMENTS

| | | | |
|---|---|---|---|
| 4,775,955 | 10/1988 | Liu | 364/900 |
| 4,885,680 | 12/1989 | Anthony et al. | 364/200 |
| 5,313,609 | 5/1994 | Baylor et al. | 395/425 |
| 5,606,686 | 2/1997 | Tarui et al. | 395/448 |
| 5,680,576 | 10/1997 | Laudon | 395/472 |
| 5,684,977 | 11/1997 | Van Loo et al. | 395/470 |
| 5,893,144 | * 4/1999 | Wood et al. | 711/122 |
| 6,085,295 | * 7/2000 | Ekanadham et al. | 711/145 |
| 6,108,764 | * 8/2000 | Baumgartner et al. | 712/28 |

OTHER PUBLICATIONS

T.D. Lovett et al., "Numa–Q: An Sci–Based Enterprise Server," Sequent Computer Systems, 1996.

* cited by examiner

Primary Examiner—Do Hyun Yoo
Assistant Examiner—Vu A. Pharm
(74) Attorney, Agent, or Firm—Casimer K. Salys; Bracewell & Patterson, L.L.P.

(57) ABSTRACT

A method and system for providing an eviction protocol within a non-uniform memory access (NUMA) computer system are disclosed. A NUMA computer system includes at least two nodes coupled to an interconnect. Each of the two nodes includes a local system memory. In response to a request for evicting an entry from a sparse directory, an non-intervention writeback request is sent to a node having the modified cache line when the entry is associated with a modified cache line. After the data from the modified cache line has been written back to a local system memory of the node, the entry can then be evicted from the sparse directory. If the entry is associated with a shared line, an invalidation request is sent to all nodes that the directory entry indicates may hold a copy of the line. Once all invalidations have been acknowledged, the entry can be evicted from the sparse directory.

14 Claims, 6 Drawing Sheets

METHOD AND SYSTEM FOR PROVIDING AN EVICTION PROTOCOL WITHIN A NON-UNIFORM MEMORY ACCESS SYSTEM

BACKGROUND OF THE INVENTION

1. Technical Field

The present invention relates to a method and system for data processing in general, and in particular to a method and system for providing an eviction protocol for a sparse directory. Still more particularly, the present invention relates to a method and system for evicting a cache line from a sparse directory within a non-uniform memory access computer system.

2. Description of the Prior Art

It is well-known in the computer arts that greater computer system performance can be achieved by combining the processing power of several individual processors to form a multiprocessor (MP) computer system. MP computer systems can be designed with a number of different topologies, depending on the performance requirements of a particular application. A symmetric multiprocessor (SMP) configuration, for example, is one of the simpler MP computer system topologies that are commonly used, in which resources such as a system memory are shared by multiple processors. The topology name "symmetric" stems from the fact that all processors within an SMP computer system have symmetric access to all resources within the system.

Although the SMP topology permits the use of relatively simple inter-processor communication and data sharing protocols, the SMP topology overall has a limited scalability and bandwidth, especially at the system memory level as the system scale increases. As a result, another MP computer system topology known as non-uniform memory access (NUMA) has emerged as an alternative design that addresses many of the limitations of the SMP topology, at the expense of some additional complexity.

A typical NUMA computer system includes a number of interconnected nodes. Each node includes at least one processor and a local "system" memory. The NUMA topology name stems from the fact that a processor has lower access latency with respect to data stored in the system memory at its local node than with respect to data stored in the system memory at a remote node. NUMA computer systems can be further classified as either non-cache coherent or cache coherent, depending on whether or not data coherency is maintained among caches in different nodes. The NUMA topology addresses the scalability limitations of the conventional SMP topology by implementing each node within a NUMA computer system as a smaller SMP system. Thus, the shared components within each node can be optimized for use by only a few processors, while the overall system benefits from the availability of larger scale parallelism with relatively low latency.

There are several problems associated with the development of an eviction protocol for a sparse directory within a NUMA computer system. The first problem arises from the management of an entry that is selected to be evicted, the second problem arises from the generation of remote transactions that are used to cause the eviction to occur, and the third problem arises from the generation of a transaction to cause the actual writeback of data to the local memory. Consequently, it would be desirable to provide an improved method for evicting a cache line from a sparse directory within a NUMA computer system.

SUMMARY OF THE INVENTION

In accordance with the method and system of the present invention, a NUMA computer system includes at least two nodes coupled to an interconnect. Each of the two nodes includes a local system memory. In response to a request for evicting an entry from a sparse directory, an non-intervention writeback request is sent to a node having the modified cache line when the entry is associated with a modified cache line. After the data from the modified cache line has been written back to a local system memory of the node, the entry can then be evicted from the sparse directory. If the entry is associated with a shared line, an invalidation request is sent to all nodes that the directory entry indicates may hold a copy of the line. Once all invalidations have been acknowledged, the entry can be evicted from the sparse directory.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

I. Nums System

A. A. System Overview

Figure 1:
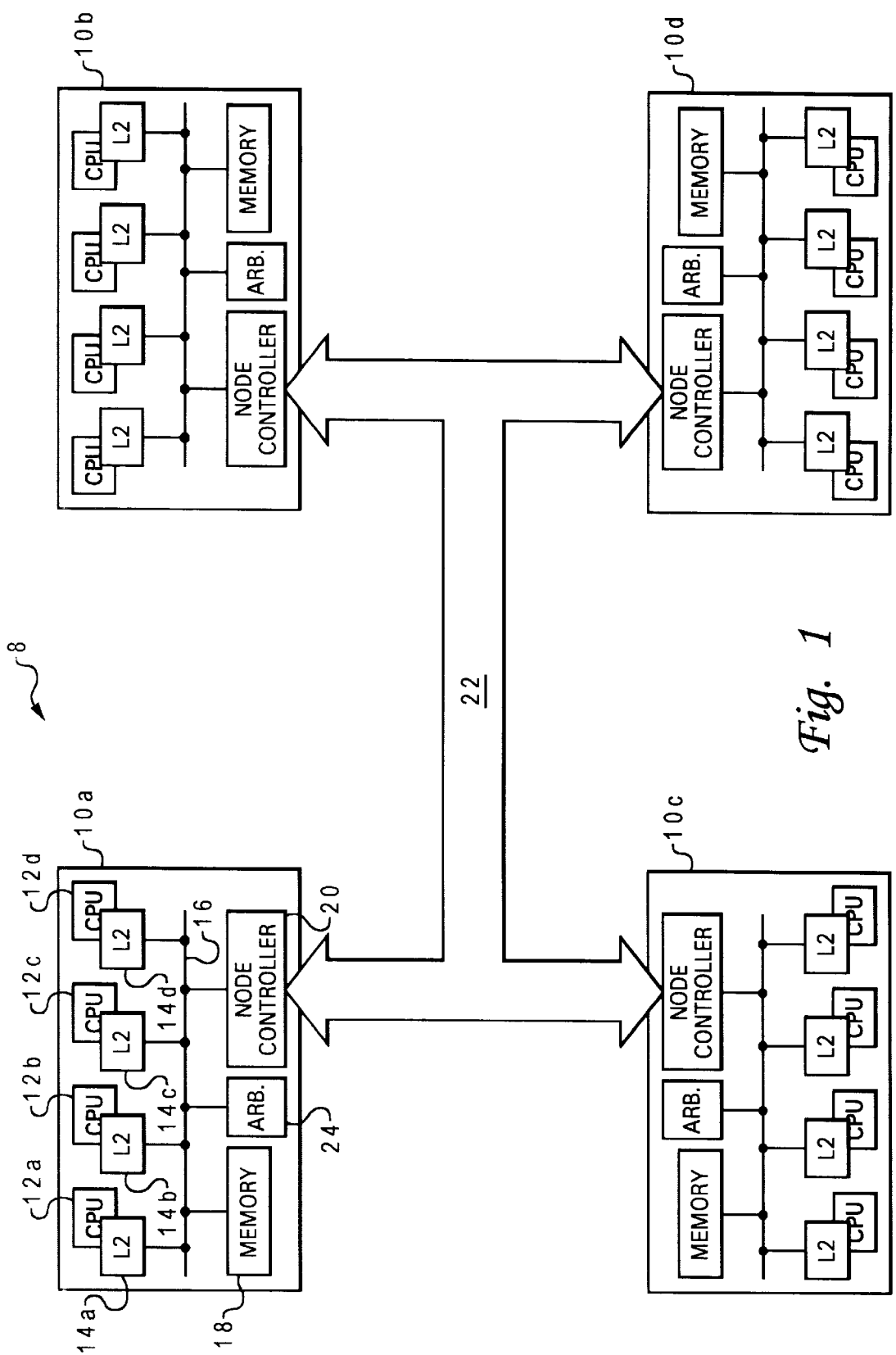
FIG. 1 is a block diagram of a non-uniform memory access (NUMA) computer system in accordance with a preferred embodiment of the present invention.

Referring now to the drawings and in particular to FIG. 1, there is illustrated a block diagram of a non-uniform memory access (NUMA) computer system in accordance with a preferred embodiment of the present invention. The depicted embodiment can be realized, for example, as a workstation, server, or mainframe computer. As shown, NUMA computer system 8 includes a number (N) of processing nodes 10a–10d, which are interconnected by node interconnect 22. Processing nodes 10a–10d each include at least one, and up to M, processors 12. Processors 12a–12d are preferably identical and may comprise a processor within the PowerPC™ line of processors available from the International Business Machines (IBM) Corporation of Armonk, New York. In addition to the registers, instruction flow logic and execution units utilized to execute program instructions, each of processors 12a–12d also includes an on-chip level one (L1) cache (not shown), which together with a respective one of level two (L2) caches 14a–14d is utilized to stage data to the associated processor 12 from system memory 18. In other words, the L1 caches and L2 caches 14a–14d function as intermediate storage between the system memory 18 and processors 12 that temporarily buffer data that are likely to be accessed by the associated processor 12. L2 caches 14 typically have a much larger storage capacity than the L1 caches, but at a longer access latency. For example, L2 caches 14a–14d may have a storage capacity of 1–16 megabytes (MB), while the on-chip L1 caches may have a storage capacity of 8–32 kilobytes. Although L2 caches 14a–14d are illustrated in FIG. 1 as external to processors 12, it should be understood that L2 caches 14a–14d could alternatively be incorporated within the associated processor 12 as an additional level of on-chip cache memory. Furthermore, it should be understood that one or more additional levels of cache memory (L3, L4, etc.) could be utilized to provide additional data storage. In the following discussion, each processor 12 and its associated cache hierarchy (L1, L2, etc.) is considered to be a single snooper.

As shown, processing nodes 10a–10d further include a respective node controller 20, which, together with system memory 18 and L2 caches 14a–14d, is coupled to local interconnect 16. Each node controller 20 serves as a local agent for remote processing nodes 10 by performing at least two functions. First, each node controller 20 snoops the associated local interconnect 16 and facilitates the transmission of local communication transactions to remote processing nodes 10. Second, each node controller 20 snoops communication transactions on node interconnect 22 and masters relevant communication transactions on the associated local interconnect 16. Communication on each local interconnect 16 is controlled by an arbiter 24. As discussed further below, arbiters 24 regulate access to local interconnects 16 based on bus request signals generated by processors 12 and compile coherency responses for snooped communication transactions on local interconnects 16.

Of course, NUMA computer system 8 can further include additional devices that are not necessary for an understanding of the present invention and are accordingly omitted in order to avoid obscuring the present invention. For example, each node 10 may also support I/O devices (e.g., a display device, keyboard, or graphical pointer), non-volatile storage for storing an operating system and application software, and serial and parallel ports for connection to networks or attached devices.

B. Memory Organization

All of processors 12 in NUMA computer system 8 share a single physical memory space, meaning that each physical address is associated with only a single location in one of system memories 18. Thus, the overall contents of the system memory, which can generally be accessed by any processor 12 in NUMA computer system 8, can be viewed as partitioned between the four system memories 18. For example, for the illustrative embodiment of the present invention shown in FIG. 1, processors 12 address a 16 gigabyte address space including both a general purpose memory area and a reserved area. The general purpose memory area is divided into 500 megabyte segments, with each of the four processing nodes 10 being allocated every fourth segment. The reserved area, which may contain approximately two gigabyte, includes system control and peripheral memory and I/O areas that are each allocated to a respective one of processing nodes 10.

For purposes of the present discussion, the processing node that stores a particular datum in its system memory 18 is said to be the home node for that datum; conversely, other processing nodes are said to be remote nodes with respect to the particular datum.

C. Memory Coherency

Because data stored within each system memory 18 can be requested, accessed, and modified by any processor 12 within NUMA computer system 8, NUMA computer system 8 implements a cache coherency protocol to maintain coherency both between caches in the same processing node and between caches in different processing nodes. Thus, NUMA computer system 8 is properly classified as a CC-NUMA computer system. The cache coherence protocol that is implemented is implementation-dependent and may comprise, for example, the well-known Modified, Exclusive, Shared, Invalid (MESI) protocol or a variant thereof. Hereafter, it will be assumed that L1 caches, L2 caches 14, and arbiters 24 implement the conventional MESI protocol, of which node controllers 20 recognize the M, S and I states and consider the E state to be merged into the M state for correctness. That is, node controllers 20 assume that data held exclusively by a remote cache has been modified, whether or not the data has actually been modified.

D. Interconnect Architecture

Local interconnects 16 and node interconnect 22 can each be implemented with any bus-based broadcast architecture, switch-based broadcast architecture, or switch-based non-broadcast architecture. However, in a preferred embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response— are utilized to convey information between processing nodes 10 via node interconnect 22 and between snoopers via local interconnects 16. Referring now to Tables I and II, a summary of relevant fields and definitions are given for address and data packets, respectively.

TABLE I

| Field Name | Description |
|---|---|
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| AParity <0:2> | Indicates parity for address bits <0:63> |
| TDescriptors | Indicate size and type of communication transaction |

TABLE II

| Field Name | Description |
|---|---|
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 10, status and coherency responses are communicated between each snooper and the local arbiter 24. The signal lines within local interconnects 16 that are utilized for status and coherency communication are summarized below in Table III.

TABLE III

| Signal Name | Description |
|---|---|
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Status and coherency responses transmitted via the AResp and AStat lines of local interconnects 16 preferably have a fixed but programmable timing relationship with the associated address packets. For example, the AStatOut votes, which provide a preliminary indication of whether or not each snooper has successfully received an address packet transmitted on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
|---|---|
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V, which lists such AResp votes in order of descending priority.

TABLE V

| Coherency responses | Meaning |
|---|---|
| Retry | Source of request must retry transaction — usually for flow control reasons |
| Modified intervention | Line is modified in cache and will be sourced from cache to requestor |
| Shared intervention | Line is unmodified in cache (and possibly shared) and will be sourced from cache to requestor |
| ReRun | Snooped request has long latency and source of request will be instructed to reissue transaction at a later time |
| Shared | Line is held shared in cache |
| Null | Line is invalid in cache |

The ReRun AResp vote, which is usually issued by a node controller 20, indicates that the snooped request has a long latency (e.g., the request will be serviced by a processor 12 or system memory 18 at a remote processing node) and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Figure 2A:
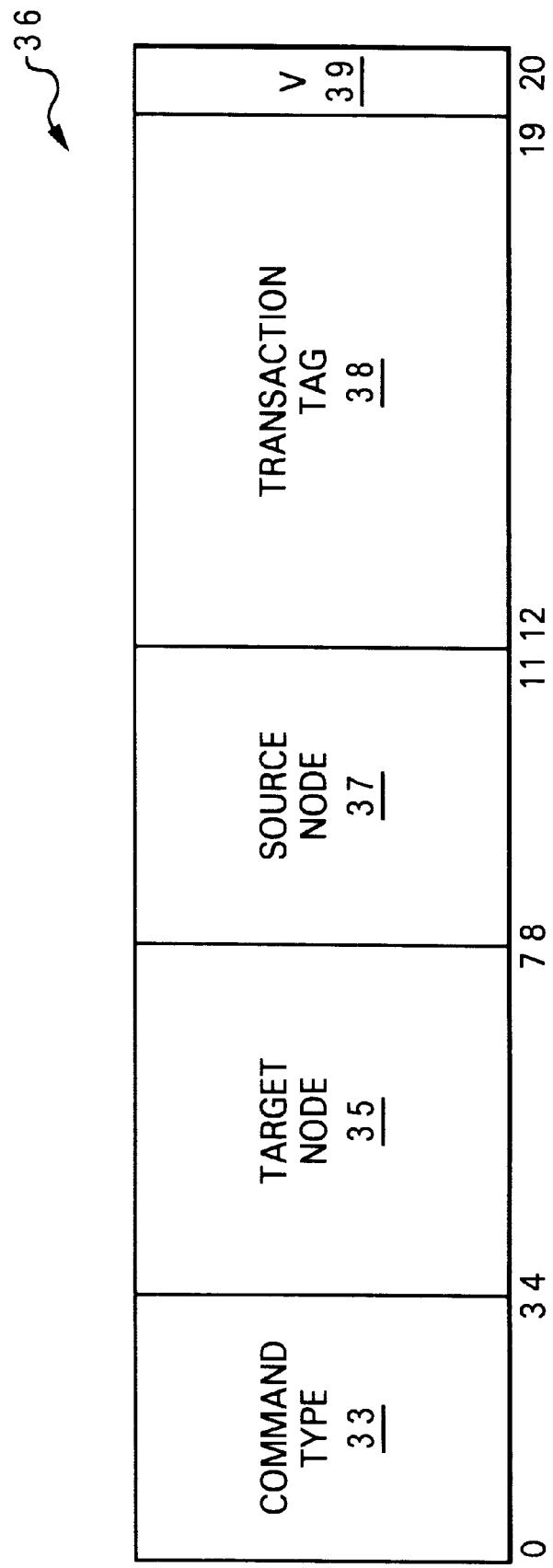
FIG. 2a depicts an illustrative embodiment of an I-command.

Referring now to FIG. 2a, there is illustrated an exemplary embodiment of an I-command that is utilized to communicate the responses and commands between node controllers 20 over interconnect 22. As shown, an I-command 36 includes five fields: a command type field 33, a target node field 35, a source node field 37, a transaction tag field 38, and a valid (V) field 39. Command type field 33 provides an encoded indication of the type of I-command 36. Some of the possible I-commands that can be encoded within command type field 33 are listed below in Table VI.

TABLE VI

| I-command groups | I-command types | Meaning |
|---|---|---|
| commands | 3rd node run | Run buffered transaction at third (target) node |
| | Error | Error detected in transaction |
| | Reissue | Reissue transaction to source node |
| coherency responses | Retry | Retry transaction — usually for flow control reasons |
| | Modified intervention | Line is modified in cache and will be sourced to target node |
| | Shared | Line is held shared in cache |
| | Null | Line is invalid in cache |

For each type of I-command, the recipient is specified in target node field 35, the sending node is specified in source node field 37, and the transaction to which the I-command relates is specified within transaction tag field 38. The validity of I-command 36 is indicated by valid (V) field 39.

E. Node Controller

Figure 2B:
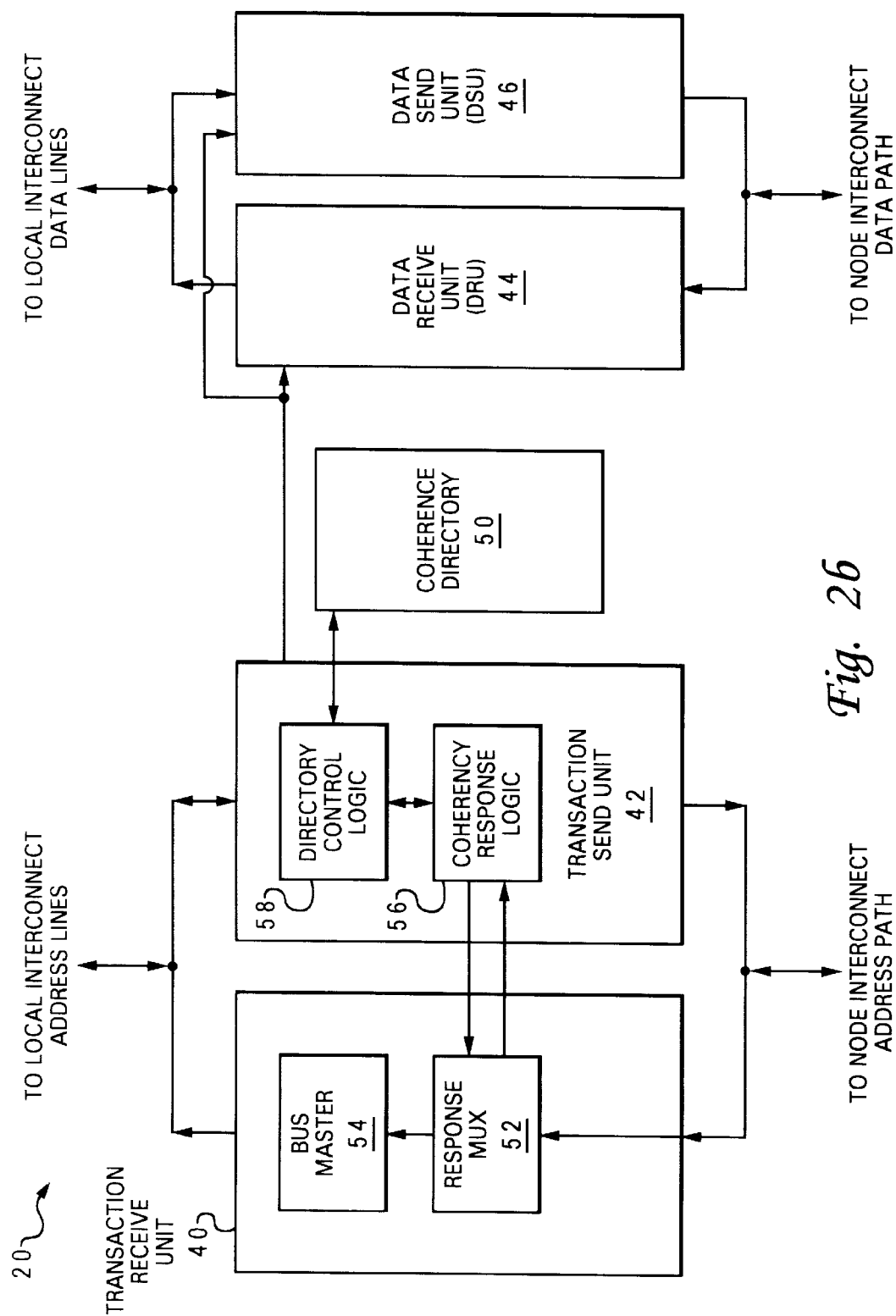
FIG. 2b is a more detailed block diagram of the node controller shown in FIG. 1.

Referring now to FIG. 2b, there is illustrated a more detailed block diagram of a node controller 20 in NUMA computer system 8 of FIG. 1. As shown in FIG. 2b, each node controller 20, which is coupled between a local interconnect 16 and node interconnect 22, includes transaction receive unit (TRU) 40, transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs) As indicated, the address and data paths through node controller 20 are bifurcated, with address signals being processed by TRU 40 and TSU 42 and data signals being processed by DSU 44 and DRU 46.

TRU 40, which is so designated to indicate transaction flow off of node interconnect 22, is responsible for receiving I-commands from other nodes via an I-command channel, accepting transactions from a shared address bus of node interconnect 22, issuing transactions on local interconnect 16, and forwarding responses to TSU 42. TRU 40 includes response multiplexer 52, which receives transactions from node interconnect 22 and passes selected transactions to both bus master 54 and coherency response logic 56 within TSU 42. In response to receipt of a communication transaction from response multiplexer 52, bus master 54 can initiate a communication transaction on its local interconnect 16 that is the same as the received communication transaction or generated for the directory control within the TSU for directory maintenance such as evictions.

TSU 42, which as indicated by its nomenclature is a conduit for transactions flowing onto node interconnect 22, interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

TABLE VII

| Coherence directory state | Possible state(s) in local cache | Possible state(s) in remote cache | Meaning |
| --- | --- | --- | --- |
| Modified (M) | I | M, E, or I | Cache line may be modified at a remote node |
| Shared (S) | S or I | S or I | Cache line may be held non-exclusively at a remote node |
| Invalid (I) | M, E, S, or I | I | Cache line is not held by any remote node |
| Pending-shared | S or I | S or I | Cache line is in the process of being invalidated at remote nodes |
| Pending-modified | I | M, E, or I | Cache line, which may be modified at a remote node, is in the process of being written back to a system memory at the home node, possibly with invalidation at the remote node |

TABLE VII-continued

| Coherence directory state | Possible state(s) in local cache | Possible state(s) in remote cache | Meaning |
| --- | --- | --- | --- |

Coherence directory 50 stores indications of the system memory addresses of data (e.g., cache lines) checked out to caches in remote nodes for which the local processing node is the home node. The address indication for each datum is stored in association with an identifier of each remote processing node having a copy of the datum and the coherency status of the datum at each such remote processing node. Possible coherency states for entries in coherency directory 50 are summarized in Table VII. As indicated in Table VII, the knowledge of the coherency states of cache lines held by remote processing nodes is imprecise. This imprecision is due to the fact that a cache line held remotely can make a transition from S to I, from E to I, or from E to M without notifying the node controller 20 of the home node.

II. Sparse Directory Eviction Overview

Figure 3:
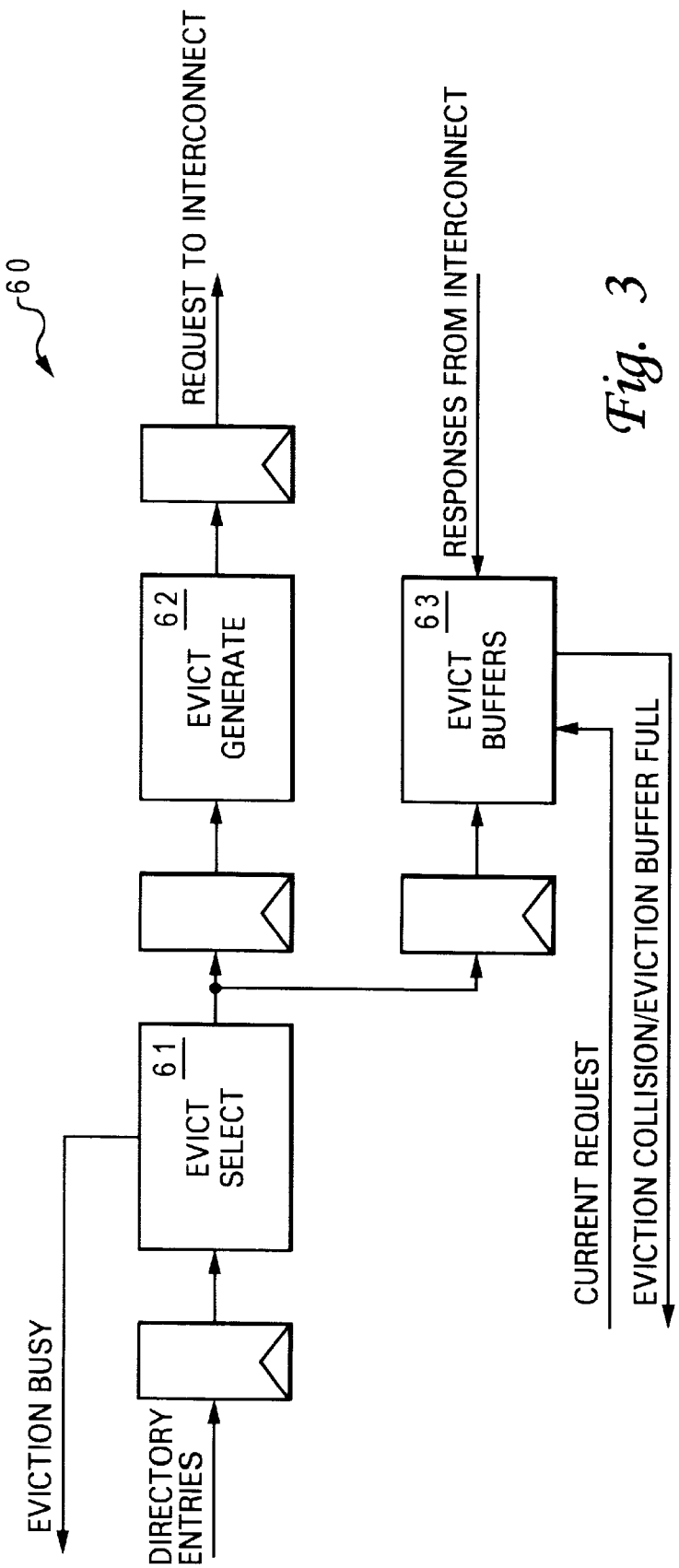
FIG. 3 is a block diagram of an eviction logic for a sparse directory, in accordance with a preferred embodiment of the present invention.

Referring now to FIG. 3, there is illustrated a block diagram of an eviction logic for a sparse directory within a NUMA computer system, in accordance with a preferred embodiment of the present invention. As shown, eviction logic 60 includes three components, namely, eviction select logic 61, evict generate logic 62, and eviction buffers 63. Eviction select logic 61 takes the state of the current entries within a coherency directory (such as coherency directory 50 from FIG. 2b) and determines the "best" choice for eviction. If all the entries within the coherency directory are in a pending state, an eviction-busy flag will be set. When the eviction-busy flag is set, any transaction that misses in the coherency directory and requires an entry to the coherency directory will be Retry'd. Evict generate logic 62 accepts the selected entry (or candidate) for eviction and generates a proper interconnect transaction required to complete the eviction. In addition to holding the information about what responses are required for the eviction to be completed, eviction buffers 63 hold the address of the memory lines that are being evicted. If a new request is received for a memory line that is being evicted, the request will be Retry'd. Once the eviction has been completed, the entry will be deleted from eviction logic 60. The coherency directory guarantees that the entries that are being evicted will not be accessed until the entry in the main coherency directory has been updated with a new entry.

In addition, evict select logic 61 utilizes a prioritized random scheme for selecting an entry from the coherency directory for eviction. The priority of the prioritized random scheme is based on the state of the coherency directory. Generally, Shared entries are selected first and Modified entries are selected next while pending entry cannot be evicted. Within a group of entries with the same state, whether in a Shared or Modified state, a continuous counter is utilized to selected an entry to evict.

Figure 4:
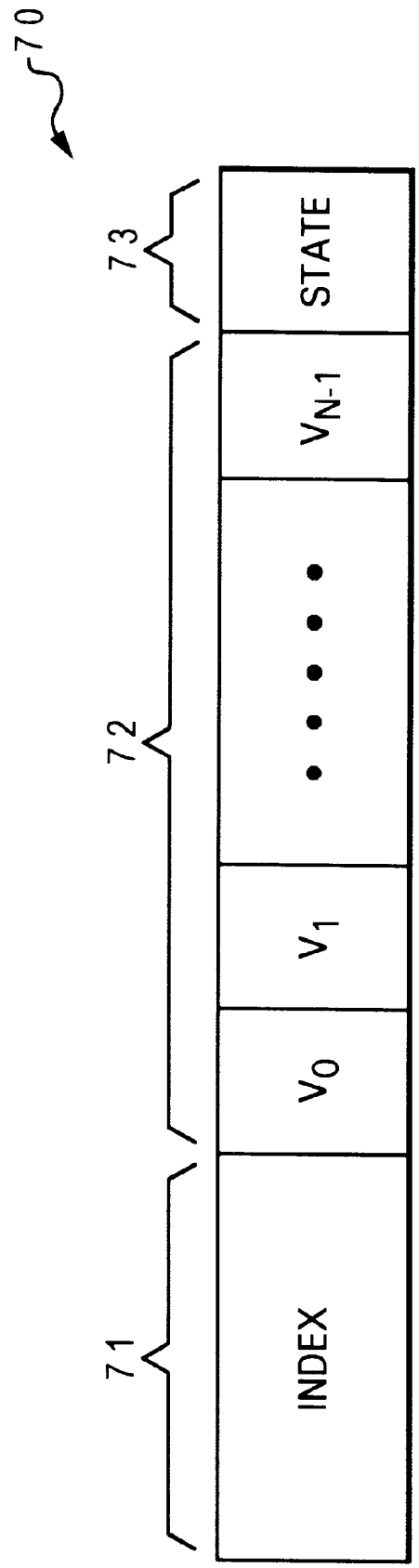
FIG. 4 is a block diagram of an entry within a sparse directory, in accordance with a preferred embodiment of the present invention.

With reference now to FIG. 4, there is illustrated a block diagram of an entry within a sparse directory, in accordance with a preferred embodiment of the present invention. As shown, an entry 70 includes an index field 71, a bit vector field 72, and a state field 73. Index field 71 contains the tag of a cache line. Bit vector field 72 indicates which nodes contains the line having an index field 71. The size (i.e., number of vectors) within vector field 72 should correspond to the number of nodes within the NUMA computer system. Bit Vi refers to node i. State field 73 indicates the state of the line having a tag contained in index field 71.

III. Sparse Directory Eviction Protocol

In order to invalidate a Shared entry, eviction logic 60 generates an invalidation transaction, a DClaim transaction in this example, that is forwarded to all nodes within the NUMA computer system that the coherency directory indicates a Shared copy may be contained within. The transaction is issued with an AutoRetry bit set, which forces a transaction receive unit (such as transaction receive unit 40 in FIG. 2b) at the destination node to continually retry the transaction locally until the transaction completes with a clean response. Once the transaction completes, a response is sent back to eviction buffers 63. Once the eviction buffer 63 receives an acknowledgement for all DClaim transactions, the entry is deleted from the eviction buffer 63. At this point, the line has been deleted from the sparse directory.

When invalidating a Modified entry, however, the local memory is required to accept the evicted data, if any. To do this, an invalidating read, a Read-with-intent to-modify (RWITM) in this example, with intervention disabled and the AutoRetry bit set is utilized. The AutoRetry bit functions similar to the DClaim transaction as described above. A non-intervention mode is required to force the processor that owns the data to generate a transactions to memory that will be issued on the home node and allow the data to be written back to the local memory of the home node. Eviction logic 60 must also guarantee that the entry will not be cleared from eviction buffers 63 until the data has been written back to the local memory. The use of a non-intervention flushing request results in the owning processor generating the writeback transaction, to which the system applies the appropriate collision detection rules. The eviction logic is only required to continue trying the RWITM request until is completes cleanly, at which time the modified data is guaranteed to have been written back to system memory at the home node.

Figure 5:
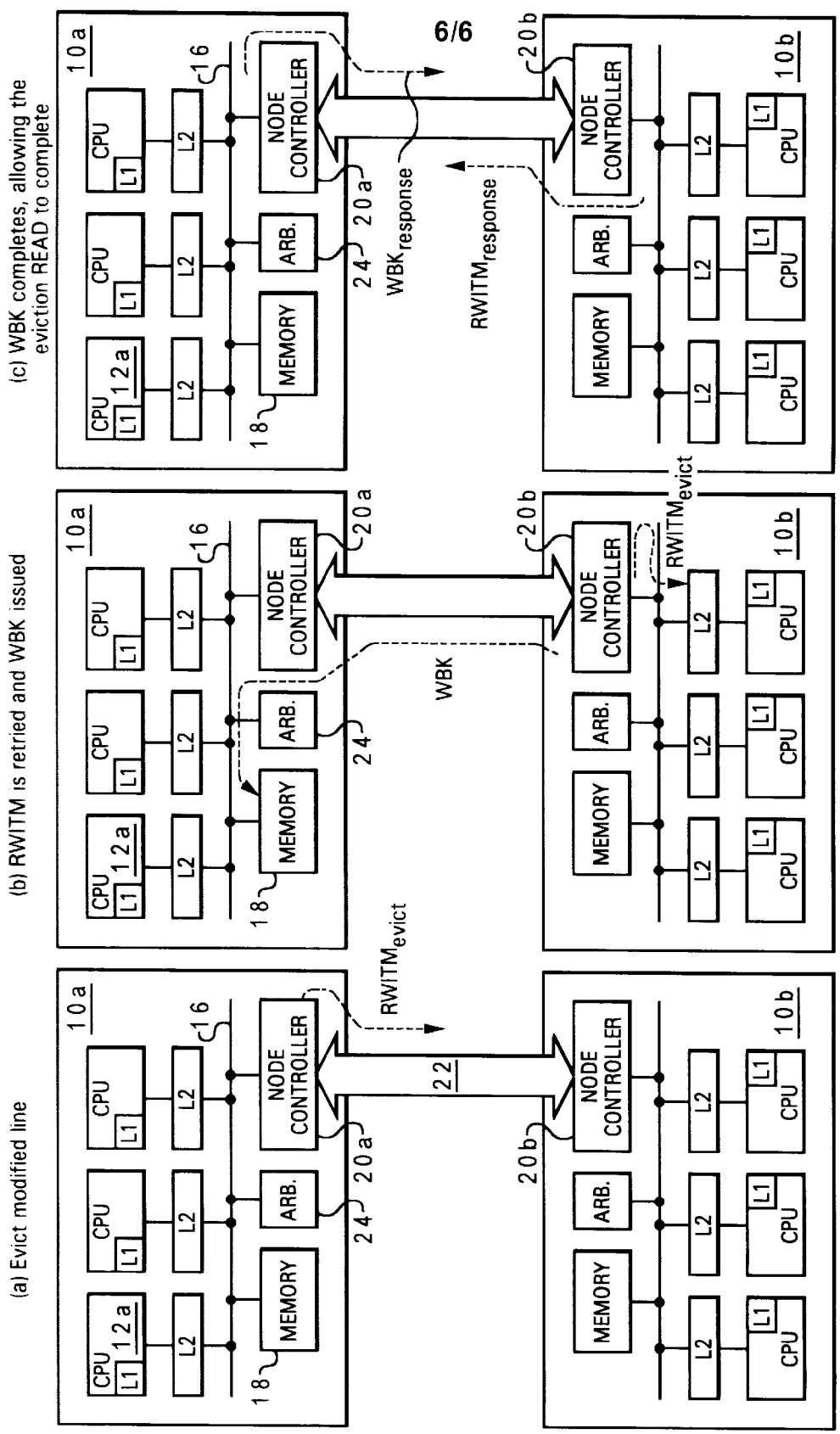
FIG. 5 depicts an example of a method for evicting a cache line from a sparse directory within a NUMA computer system, in accordance with a preferred embodiment of the present invention.

For example, as shown in FIG. 5, a home node 10a is attempting to evict a directory entry in which the line is possibly held in a Modified state at a remote node 10b. The eviction logic (from FIG. 3) generates a RWITM transaction with the AutoRetry bit asserted and the intervention enable bit unasserted (i.e., a non-intervention RWITM transaction), as shown in FIG. 5a. When the RWITM transaction is issued at remote node 10b, one of the following three scenarios is possible. The first scenario is that the RWITM transaction could be Retry'd for reasons other than a processor generating a retry as it attempts to push the modified data back to system memory. In this scenario, the AutoRetry mode will force the transaction receive unit to reissue the RWITM transaction at node 10b. The second scenario is that remote node 10b may not have the cache line modified, and the RWITM will receive a clean response. The transaction receive unit (such as transaction receive unit 40 in FIG. 2b) in node controller 20b will then send a response back to the eviction logic, and the eviction will complete. The third scenario is that a cache may have the cache line modified, and because the intervention is disabled, the processor will retry the RWITM and then attempt to push the data back to the local memory with a write-back-kill (WBK) request.

Node controller 20 at node 10b will then ReRun this transaction as it is a request to a remote memory. Meanwhile, the transaction receive unit in node controller 20b will continue to Retry the eviction RWITM transaction, as shown in FIG. 5b, but since the transaction receive unit in node controller 20b ReRun'd the WBK transaction, the transaction send unit in node controller 20b will retry the eviction RWITM transaction. Once the WBK request is completed on home node 10a, and the data transfer completes, home node 10a will send a response back to remote node 10b that will clear the WBK request from the pending buffer in the transaction send unit in node controller 20b, as shown in FIG. 5c. When the transaction send unit in node controller 20b attempts to issue the eviction transaction again, the transaction receive unit in node controller 20b will receive a clean response, because the owning processor no longer has the cache line modified. The transaction receive unit in node controller 20b will forward the response back to the eviction logic in node 10a, which will clear the pending buffer. The directory entry, which contained an entry for a modified cache line, has now been successfully evicted from the coherency directory of the node, and the local memory has the valid data.

As has been described, the present invention provides a method for providing an eviction protocol for a sparse directory within a NUMA computer system.

While the invention has been particularly shown and described with reference to a preferred embodiment, it will be understood by those skilled in the art that various changes in form and detail may be made therein without departing from the spirit and scope of the invention.

What is claimed is:

1. A method for providing an eviction protocol for a sparse directory within a non-uniform memory access (NUMA) computer system, wherein said NUMA computer system includes at least two nodes coupled to an interconnect, each of said at least two nodes includes a local system memory, said method comprising the steps of:
   in response to a request for evicting an entry from a sparse directory, wherein said entry is associated with a modified cache line, sending an non-intervention writeback request from a home node of said modified cache line to a remote node having said modified cache line;
   initiating a second writeback request from said remote node to write back said modified cache line to said home node while retrying said non-intervention writeback request at said remote node; and
   evicting said entry from said sparse directory after said non-intervention writeback request at said remote node has been completed.

2. The method according to claim 1, wherein said non-intervention writeback request is an non-intervention writeback with AutoRetry.

3. The method according to claim 1, wherein said non-intervention writeback request is an non-intervention read-with-intent-to-modify transaction.

4. The method according to claim 1, wherein said second writeback request is a write-back-kill request.

5. The method according to claim 1, wherein said non-intervention writeback request is completed with a clean response.

6. The method according to claim 1, wherein said evicting step is initiated by said remote node after said non-intervention writeback request at said remote node has been completed.

7. The method according to claim 1, wherein said entry in said sparse directory indicates said modified cache line is shared by said home node and said remote node.

8. A non-uniform memory access (NUMA) computer system capable of providing an eviction protocol for a sparse directory, wherein said NUMA computer system includes at least two nodes coupled to an interconnect, each of said at least two nodes includes a local system memory, said NUMA computer system comprising:

means for sending an non-intervention writeback request from a home node of a modified cache line to a remote node having said modified cache line, in response to a request for evicting an entry from a sparse directory, wherein said entry is associated with said modified cache line;

means for initiating a second writeback request from said remote node to write back said modified cache line to said home node while retrying said non-intervention writeback request at said remote node; and means for evicting said entry from said sparse directory after said non-intervention writeback request at said remote node has been completed.

9. The NUMA computer system according to claim 8, wherein said non-intervention writeback request is an non-intervention writeback with AutoRetry.

10. The NUMA computer system according to claim 8, wherein said non-intervention writeback request is an non-intervention read-with-intent-to-modify transaction.

11. The NUMA computer system according to claim 8, wherein said second writeback request is a write-back-kill request.

12. The NUMA computer system according to claim 8, wherein said non-intervention writeback request is completed with a clean response.

13. The NUMA computer system according to claim 8, wherein said evicting means is initiated by said remote node after said non-intervention writeback request at said remote node has been completed.

14. The NUMA computer system according to claim 8, wherein said entry in said sparse directory indicates said modified cache line is shared by said home node and said remote node.

\* \* \* \* \*